(No Model.)
P. MUELLER.
PIPE ROD COUPLING.
No. 486,290.  Patented Nov. 15, 1892.
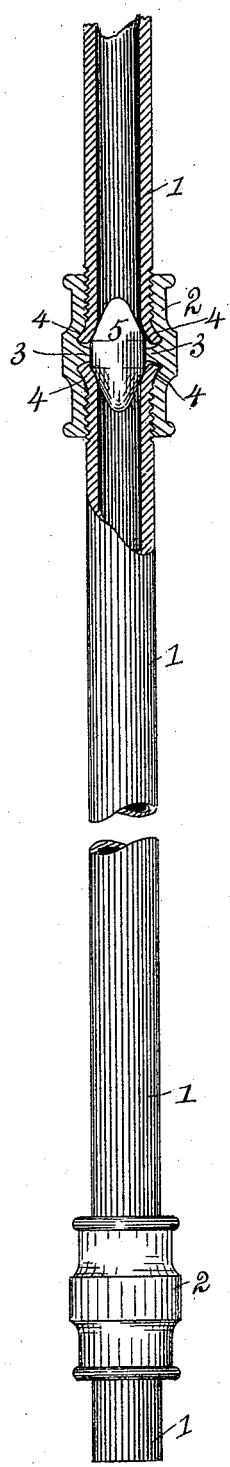
ATTEST.
Helen Graham
William Graham
INVENTOR
PHILIP MUELLER
by L. P. Graham
his attorney

UNITED STATES PATENT OFFICE.

PHILIP MUELLER, OF DECATUR, ILLINOIS.

PIPE-ROD COUPLING.

SPECIFICATION forming part of Letters Patent No. 486,290, dated November 15, 1892.

Application filed May 20, 1892. Serial No. 433,672. (No model.)

*To all whom it may concern:*

Be it known that I, PHILIP MUELLER, of Decatur, in the county of Macon and State of Illinois, have invented certain new and useful Improvements in Pipe-Rod Couplings, of which the following is a specification.

This invention is intended to form a continuous rod of sections of pipe by coupling the sections undetachably together. It is particularly applicable for use as a valve-rod for stop and waste cocks and it is embodied in the details of construction and combinations of parts hereinafter set forth and specifically claimed.

In the drawing forming part of this specification fragments of pipe, partly in section, are shown and both the interior and the exterior construction of the coupling are illustrated.

The pipes are represented at 1 and the coupling at 2. An annular partition 3 is formed transversely in the coupling at the longitudinal center thereof, and recesses or enlargements of the bore of the coupling are formed at 4 on both sides of the partition. The partition has an opening large enough to receive the plug 5, and such plug is conical or conoidal at its ends and somewhat larger at its greatest diameter than the internal diameter of the pipes. The junction is made by screwing one section of pipe into the coupling until the partition is encountered, then dropping a plug into the coupling, and then screwing the opposite section of pipe into the coupling until the inclines of the plug shall have spread the ends of the pipe into the recesses of the coupling, as shown. A rod formed of sections so coupled will stand severe torsional strain without uncoupling, and in addition to its peculiar adaptability to stop and waste cocks is of utility where a comparatively-light and torsionally-strong rod is used or desired.

The annular partition acts to prevent the pipe first connected from passing the center of the coupling and is very desirable on that account. It is not entirely indispensable, however, as with the exercise of care on the part of the manipulator the pipe may be stopped at the proper place, and when that is done the coupling may be made, as described, without the use of the partition.

I claim—

1. A pipe-rod coupling comprising a coupling-sleeve internally threaded at both ends and having centrally an annular internal enlargement and recesses on both sides of said enlargement, two lengths of pipe having their cylindrical peripheries screw-threaded adjacent to their ends and said ends expanded within the recesses of the coupling-sleeve, and a smooth-surfaced plug diametrically larger than the internal diameter of the pipe and having rounded or conoidal ends, substantially as set forth.

2. A pipe-rod coupling comprising a coupling-sleeve internally threaded at both ends and having a central annular partition with annular recesses on both sides of said partition, pipes externally screw-threaded and having their ends abutting against said partition, and a smooth-surfaced plug diametrically larger than the internal diameter of the pipes and having rounded conoidal ends, substantially as described.

In testimony whereof I sign my name in the presence of two subscribing witnesses.

PHILIP MUELLER.

Attest:
O. W. DAWSON,
EDWARD ADAMS.